United States Patent [19]

Chandler et al.

[11] Patent Number: 4,697,429
[45] Date of Patent: Oct. 6, 1987

[54] RAPID CHILL REFRIGERATOR CONTROL

[75] Inventors: Michael S. Chandler; R. Charles Fiddler, both of Parsons, Tenn.

[73] Assignee: Kolpak Industries, Inc., Parsons, Tenn.

[21] Appl. No.: 773,187

[22] Filed: Sep. 6, 1985

[51] Int. Cl.⁴ .............................................. F25B 1/00
[52] U.S. Cl. ........................................ 62/203; 62/231; 236/78 B
[58] Field of Search ............ 62/130, 231, 203, 228 R; 236/78 B, 46 E

[56] References Cited

U.S. PATENT DOCUMENTS

| | | | |
|---|---|---|---|
| 2,263,241 | 11/1941 | Harvey | 62/231 |
| 2,311,000 | 2/1943 | Smith et al. | 62/157 |
| 3,062,943 | 11/1962 | Euler | 236/46 D |
| 3,323,724 | 6/1967 | Willson | 236/46 D |
| 3,381,488 | 5/1968 | Lewis | 62/126 |
| 3,691,782 | 9/1972 | Holzer | 236/78 B |

FOREIGN PATENT DOCUMENTS 295571 7/1983 Japan .............................. 62/231

OTHER PUBLICATIONS

Victory Series 6 Rapid Chill Refrigerators Traulsen & Co., Inc., Model RR1 1-34 HUT-QC, Sep. 1983.

*Primary Examiner*—William E. Wayner
*Attorney, Agent, or Firm*—Irvin A. Lavine

[57] ABSTRACT

A rapid chill refrigerator has a first chill refrigeration system a second maintenance refrigeration. A product temperature probe and an adjustable timer control the chill refrigeration system to turn it off when a preselected product interior temperature is reached or after a predetermined time has elasped.

2 Claims, 1 Drawing Figure

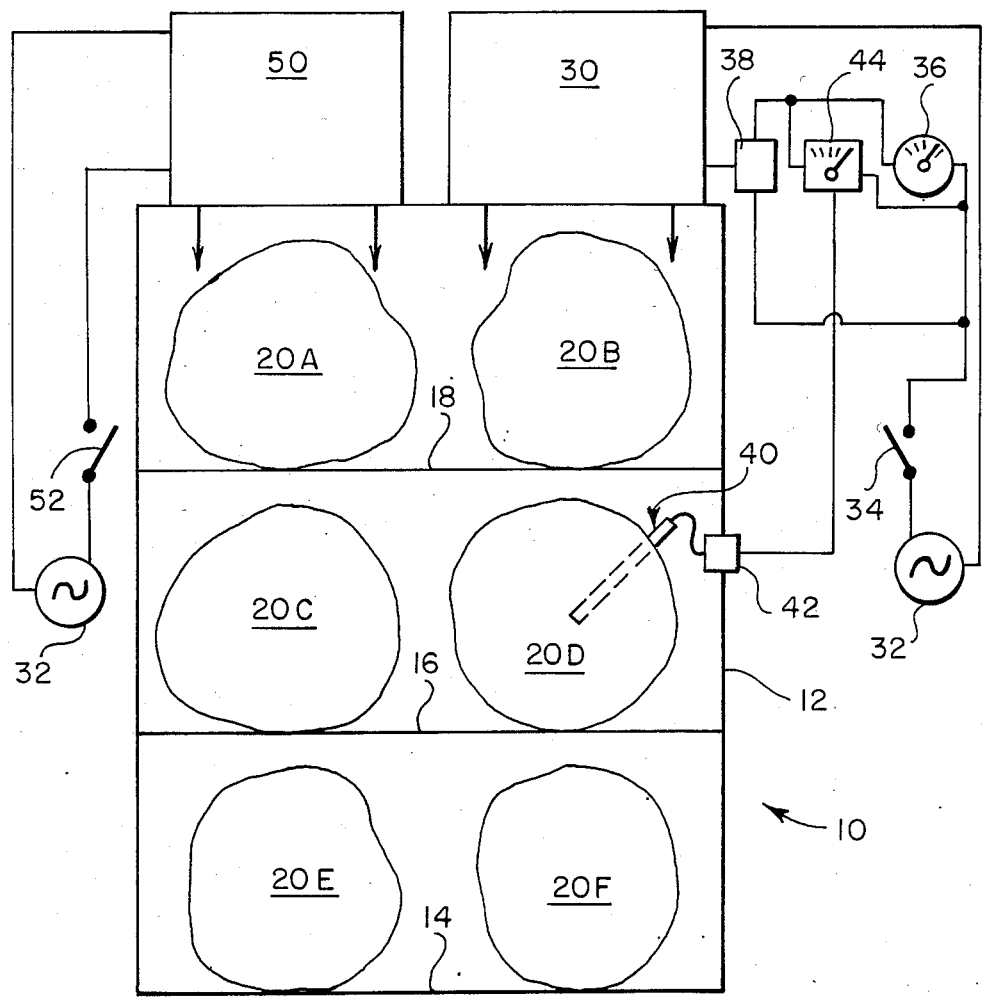

RAPID CHILL REFRIGERATOR CONTROL

TECHNICAL FIELD

The present invention relates to a rapid chill refrigerator having separate refrigeration systems, and to the controls therefor.

BACKGROUND ART

In the processing of food, such as large roast, other meat and large batches of vegetables, the food is substantially solid, and weighs many pounds. After the food is cooked, it is desired that the temperature be lowered as rapidly as possible, after which the temperature is maintained at a pre-selected level. The temperature to be reached and maintained is the internal temperature of the food product, since it is known that the surface temperature and the temperature of the interior may be substantially different during the chilling process, and until a stabilized and uniform temperature of the product is achieved.

To effect the above noted rapid chilling and low temperature maintenance functions, there has been provided so called "Rapid Chill Refrigerators". These refrigerators are provided with two independent refrigeration systems. One refrigeration system is known as the "Chill Refrigeration System" and the other refrigeration system is known as the "Maintenance Refrigeration System". In order to lower the temperature of the product as rapidly as possible, both refrigeration systems are employed; after a period of time, a timer set for a pre-selected time duration causes the chill refrigeration system to be cut off, thereby leaving the maintenance refrigeration system to continue in operation, so as to maintain the food product at a desired temperature.

The known rapid chill refrigerators have been provided as above noted, with an adjustable timer to control the rapid chill refrigeration system, so that it operates over a pre-selected period of time after its actuation. Such rapid chill refrigerators have also been provided with a product temperature probe, connected either to an indicator or to an alarm circuit which is in turn connected to an indicator, to thereby give either or both of a visual indication of the internal temperature of a selected product within the rapid chill refrigerator and/or to provide an alarm when the product has reached a pre-selected temperature.

A basis of utilizing a timer control circuit is that testing, as by the manufacturer, provides an indication that a certain number of food products, each averaging a certain weight, and with a beginning temperature of a certain level, has been found to require a certain length of time for the interior of the products to be chilled. The rapid chill refrigerator user sets the timer control for the period indicated by the manufacturer of the rapid chill refrigerator for the particular load.

It has now been recognized that the above procedure of testing to obtain timing information for particular food loads by the equipment manufacturer at its facility, and then the reliance on that information by the user, does not provide uniform results. This is because of factors which are encountered by the users which are different from the test product and facility. For example, the user may not be able to control the quantity of food in a given load to be rapid chilled. The elevated start temperature of the food product may differ from the tested product. Some food is air cooled between cooking and rapid chilling, so that different loads may have had different air cooling periods, thereby varying the starting temperature for the rapid chill process. Additionally, the user's environment, such as room temperature, may vary from load to load, and from the room temperature of the test facility.

DISCLOSURE OF INVENTION

A rapid chill refrigerator is provided having first and second refrigeration systems, one being a chill refrigeration system and the other being a maintenance refrigeration system. A product temperature probe is connected in a control circuit for the chill refrigeration system. In addition, there may be provided an adjustable timer in the control circuit for the chill refrigeration system. The product temperature probe and control circuit stop the operation of the chill refrigeration system when the interior of the food product reaches a pre-selected temperature; the user may obtain information on rapid chill time for particular food product loads at its own location, and based on that reliable information use the timer to control the de-activation of the chill refrigeration system.

BRIEF DESCRIPTION OF THE DRAWINGS

The single FIGURE of the drawing is a schematic representation of a rapid chill refrigeration and control system in accordance with the present invention.

BEST MODE OF CARRYING OUT THE INVENTION

Referring now to the drawing, there is shown a rapid chill refrigerator 10, including a cabinet 12, within which are shelves 14, 16, and 18. On each of the shelves there are a plurality of food products, such as beef roast, mashed potatoes, etc., generally designated 20A–20F. The food products 20A–20F are arranged as desired, there being shown two food products on each of the shelves 14, 16, and 18. The food products are cooked in bulk, and then rapidly chilled to a maintenance temperature, which is conventionally approximately 45° F. The cabinet is schematically indicated, and will include doors, insulation, etc., which are not shown for purposes of clarity.

An alternating current source 32 supplies electricity to a rapid chill refrigeration system 30, which is of conventional construction, and includes a motor for driving a compressor; the motor receives electric current from source 32 through a control circuit. The control circuit includes a manual off-on switch 34, a timer 36, a relay contact 38 and a product temperature probe 40 connected through a junction box 42 in the wall of the refrigerator cabinet 12 to an adjustable digital temperature controller 44. The adjustable digital temperature controller 44 is of a known type, such as is manufactured by Clifton Industries, Inc. Long Island City, N.Y., Model 670 20.290 and is in parallel with the conventional timer 36. Source 32 is connected to the motor of the rapid cool refrigeration system 30 through the relay contact 38.

A maintenance refrigeration system 50 is provided, connected to alternating current source 32 through a circuit including a main on-off switch 52. As will be understood, a thermostatic control, connected to the cabinet 12, may also be provided in the circuit for the maintenance refrigeration system 50.

In operation, the maintenance refrigeration system 50 is normally in operation, switch 52 being closed. The food products 20A–20F are placed on the shelves 14, 16, and 18 of the refrigerator cabinet 12, and the probe 40 is placed in a representative one of the food products, such as 20D. The switch 34 is closed, thereby additionally placing into operation the rapid chill refrigeration system 30 and the maintenance refrigeration system 50. The adjustable digital temperature controller 44 is adjusted to a pre-selected temperature such as 45° F. A signal from probe 40 indicative of product interior temperature is supplied to controller 44, and when the interior temperature of food product 20D reaches, for example, 45° F., current to relay 38 will be interrupted, to open the circuit between the motor of rapid chill refrigeration system 30 and source 32, thereby halting its operation. The maintenance refrigeration system 50 will continue to function, thereby maintaining the food products within the refrigeration cabinet 12 at the desired temperature level.

If, after a particular operator is able to observe that a particular loading of the refrigerator cabinet 12 with a specific food product achieves a reduction in interior temperature to 45° F. within a particular time, operation with probe 40 for such load may be discontinued: the probe 40 may be disconnected at the junction box 42 and the timer 36 may be set to the noted time period.

There has been provided a rapid chill refrigerator control system which achieves a uniformity of the interior temperature of the food product, regardless of whether there are differences of various factors of one refrigerator load in relation to another. Thus, regardless of whether the food loaded into the refrigerator is the same as a previous load, whether the starting temperature is the same, whether the food has been air cooled for a longer or shorter period, whether the food had the same finished cooking temperature, and also, whether the ambinent temperature in the room was the same as previously, the present invention apparatus effects the rapid chilling of the food product unitl its interior temperature reaches a pre-selected temperature, after which the temperature of the food product within the refrigerator is maintained at the selected temperature.

The claims and the specification describe the invention herein presented and the terms that are employed in the claims draw their meaning form the use of such terms in the specification. Some terms employed in the prior art may be broader in meaning than specifically employed herein. Whenever there is a question between the broader definition of such terms as used in the prior art and the more specific use of the term herein, the more specific meaning is meant.

It will be obvious to those skilled in the art that various changes may be made in the herein disclosed apparatus. However, the invention is not limited to what is set forth in the specification or described in the drawing, but only as defined in the claims appended hereto.

We claim:

1. A rapid chill refrigerator system for lowering the temperature of a batch of heated food to a desired temperature and then maintaining said batch of food at substantially the desired temperature comprising:
    a cabinet for holding a batch of food initially in a heated condition following cooking,
    a maintenance refrigeration system for cooling the contents of the cabinet,
    a chill refrigeration system for cooling the contents of the cabinet,
    product temperature probe means for generating a signal indicative of the temperature of the interior of a product being cooled in said refrigerator,
    means for supplying current to said refrigeration systems, and
    control circuit means for controlling the supply of current to said chill refrigeration system from said supply means comprising:
        (a) means for disconnecting said chill refrigeration system from said supply means, and
        (b) means for operating said disconnecting means comprising:
            (i) an adjustable timer connected to said disconnecting means for operating said disconnecting means after a selected time,
            (ii) temperature control means for operating said disconnecting means upon receiving a signal indicative of a predetermined temperature from said probe means, said temperature control means connected to said disconnecting means and in parallel with said timer, and
            (iii) means for connecting said temperature control means to said probe means comprising means for selectively preventing a signal indicative of the temperature of a said product from reaching said temperature control means,
            (iv) said adjustable timer and said temperature control means being the only elements connected to said operating means.

2. The apparatus of claim 1, said selective signal preventing means comprising means for disconnecting said probe means from said temperature control means, whereby said first mentioned disconnecting means may be controlled solely from said timer.

* * * * *